US008929277B2

(12) United States Patent
Speight et al.

(10) Patent No.: US 8,929,277 B2
(45) Date of Patent: Jan. 6, 2015

(54) COMMUNICATION UNITS AND METHODS FOR RELAY-ASSISTED UPLINK COMMUNICATION

(71) Applicant: General Dynamics C4 Systems, Inc., Scottsdale, AZ (US)

(72) Inventors: Timothy Speight, Bristol (GB); Paul Piggin, Wiltshire (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 43 days.

(21) Appl. No.: 13/768,611

(22) Filed: Feb. 15, 2013

(65) Prior Publication Data
US 2014/0233453 A1 Aug. 21, 2014

(51) Int. Cl.
| | |
|---|---|
| H04J 3/08 | (2006.01) |
| H04W 4/00 | (2009.01) |
| H04L 12/28 | (2006.01) |
| H04B 7/14 | (2006.01) |
| H04W 72/00 | (2009.01) |
| H04W 72/04 | (2009.01) |
| H04W 74/08 | (2009.01) |
| H04W 84/04 | (2009.01) |

(52) U.S. Cl.
CPC ...... *H04W 72/0413* (2013.01); *H04W 72/0493* (2013.01); *H04W 74/0833* (2013.01); *H04W 84/047* (2013.01)
USPC ........... 370/315; 370/329; 370/341; 370/431; 455/7; 455/450

(58) Field of Classification Search
USPC ............... 370/310–350, 431–463; 455/7, 455/446–464, 509
See application file for complete search history.

(56) References Cited

U.S. PATENT DOCUMENTS

| | | | | |
|---|---|---|---|---|
| 8,442,049 | B2 * | 5/2013 | Liu et al. | 370/392 |
| 8,582,419 | B2 * | 11/2013 | Seo et al. | 370/208 |
| 8,761,073 | B2 * | 6/2014 | Liu et al. | 370/315 |

(Continued)

FOREIGN PATENT DOCUMENTS

WO 2013027014 A1 2/2013

OTHER PUBLICATIONS

Technical Specification—3rd Generation Partnership Project; Technical Specification Group Radio Access Network; Evolved Universal Terresterial Radio Access (E-UTRA); Physical layer procedures (Release 10); 3GPP TS 36.213 V10.5.0 (Mar. 2012); 25 pages.

(Continued)

*Primary Examiner* — Tri H Phan
(74) *Attorney, Agent, or Firm* — Fitch Even Tabin & Flannery LLP

(57) ABSTRACT

A relay device is described for supporting communications between a terminal device and a base station, the relay device comprises: at least one receiver; and a control processor, operably coupled to the at least one receiver and arranged to: monitor a downlink communication from the base station to the terminal device; determine therefrom at least one uplink resource to be used by the terminal device; configure the at least one receiver to receive the at least one uplink resource; receive an uplink message on the at least one uplink resource; determine therefrom uplink control information used by the terminal device; modify the uplink message on the at least one uplink resource; and relay the uplink message to the base station.

22 Claims, 13 Drawing Sheets

(56) References Cited

U.S. PATENT DOCUMENTS

| | | | | |
|---|---|---|---|---|
| 8,761,075 B2* | 6/2014 | Kim et al. | | 370/315 |
| 8,787,277 B2* | 7/2014 | Kim et al. | | 370/329 |
| 2010/0322145 A1 | 12/2010 | Yu et al. | | |
| 2011/0159802 A1 | 6/2011 | Harum et al. | | |
| 2011/0164536 A1* | 7/2011 | Lin et al. | | 370/259 |
| 2011/0170474 A1 | 7/2011 | Ji et al. | | |
| 2011/0317610 A1* | 12/2011 | Park et al. | | 370/312 |
| 2012/0294225 A1* | 11/2012 | Awad et al. | | 370/315 |
| 2013/0003586 A1 | 1/2013 | Tajima et al. | | |
| 2013/0064116 A1 | 3/2013 | Speight et al. | | |

OTHER PUBLICATIONS

Technical Specification—3rd Generation Partnership Project; Technical Specification Group Radio Access Network; Evolved Universal Terresterial Radio Access (E-UTRA) and Evolved Universal Terrestrial Radio Access Newtwork (E-UTRAN); Overall description; Stage 2 (Release 10); 3GPP TS 36.300 V10.5.0 (Sep. 2011); 194 pages.

Technical Specification—3rd Generation Partnership Project; Technical Specification Group Radio Access Network; Evolved Universal Terresterial Radio Access (E-UTRA); Medium Access Control (MAC) protocol specification (Release 10); 3GPP TS 36.321 V10.5.0 (Mar. 2012); 54 pages.

Technical Specification—3rd Generation Partnership Project; Technical Specification Group Radio Access Network; Evolved Universal Terresterial Radio Access (E-UTRA); Radio Resource Control (RRC); Protocol specification (Release 10); 3GPP TS 36.331 V10.5.0 (Mar. 2012); 302 pages.

Extended European Search Report from European Patent Application No. 14153746.4-1857; Dated: Jun. 26, 2014.

\* cited by examiner

COMMUNICATION UNITS AND METHODS FOR RELAY-ASSISTED UPLINK COMMUNICATION

FIELD OF THE INVENTION

The field of this invention relates to communication units and methods for relay-assisted uplink communication.

BACKGROUND OF THE INVENTION

A recent development in third generation (3G) wireless communications is the long term evolution (LTE) cellular communication standard, sometimes referred to as 4th generation (4G) systems. Both 3G and 4G technologies are compliant with third generation partnership project (3GPP™) standards. It is expected that 4G systems will primarily be deployed within existing spectral allocations owned by Network Operators as well as new spectral allocations that are yet to be licensed. Irrespective of whether these LTE spectral allocations use existing second generation (2G) or 3G allocations that are being re-farmed for fourth generation (4G) systems, or new spectral allocations for existing mobile communications, they will be primarily paired spectrum for frequency division duplex (FDD) operation.

In addition to the large number of standard wireless subscriber communication units that employ the above technologies, there are an increasing number of other communication devices that may usefully connect to current mobile telecommunication networks. Examples of such other communication devices include so-called machine-type wireless communication (MTC) devices for MTC-based applications, which are typified by semi-autonomous or autonomous communication of small amounts of data to a central repository on a relatively infrequent basis. Examples of MTC devices include so-called smart meters, which, for example, may be located in a customer's house and periodically transmit information back to a central MTC server, for example data relating to the customer's consumption of a utility, such as gas, water, electricity and so on. Thus, a large number of MTC devices are expected to support very low power consumption operation based on intermittent transmissions of small amounts of data.

It is also known that 'uplink-only relaying' is a network topology that may be used to address the issue of achieving low transmit power for low-cost MTC devices, for instance, in macro cellular LTE networks. In general, in relay-node applications, there is typically sufficient system gain on the downlink (i.e. base station to subscriber communication unit or terminal device) to support MTC devices (or User Equipment (UE)) (MTC-UE) at the cell edge of the macrocell of a base station, such as an eNodeB (eNB). However, with the low transmit output power of the MTC devices, the uplink (terminal device to base station) system gain is significantly less than the downlink; hence the evolved concept of 'uplink-only relaying' techniques. The use of a single-hop uplink-only relay device (sometimes referred to as relay device (RN)) can be used to address this issue and close the link budget for remote subscriber communication devices, such as MTC-UEs. Typically, only a single hop may be employed, provided that the MTC-RN can be expected to have similar characteristics to an LTE UE. In a network where relay devices (also referred to herein as relay devices) are utilised to relay uplink data from the terminal devices to the eNodeB, the eNodeB may be referred to as a donor eNodeB (DeNB).

FIG. 1 illustrates a simplified schematic of an uplink only single-hop relay communication system 100, comprising base station (such as eNodeB) 105, core network 110, relay device 115 and user equipment (UE) 120. In this simplified schematic, eNodeB 105 communicates with other eNodeBs (not shown) via the core network 110. Communication system 100 comprises an asymmetric uplink/downlink arrangement, whereby wireless downlink communications between the base station 105 and UE 120 have a direct communication path 125, but are single-hopped for the uplink communication path 130 from UE 120 to base station 105 via relay device 115. The base station 105 may also transmit control signalling on a separate downlink path 135 to relay device 115 in order to control the operation of the relay device 115.

The configuration of FIG. 1 allows lower power transmissions to be sent from the UE 120, for example where the lower power is sufficient for the MTC device's lower transmit power to be able to reach the relay device's receiver at a decodeable power level, whereas the MTC device's lower transmit power would not be able to reach the eNodeB's receiver at a decodeable power level. However, one disadvantage with this system is that the transmission time from the UE 120 to the base station 105 has been increased due to the implementation of relay device 115. Further, there is no opportunity for a downlink transmission from the relay device 115 to the UE 120. Therefore, a potential problem with uplink-only relaying in such an asymmetric arrangement is that the relay device 115 is unable to feed back control information to the MTC device (UE 120). Thus, at present, there is no known mechanism for the relay device 115 to influence efficient future transmissions between the MTC device and the base station 105 via the relay device 115, for example to control the power level of such transmissions to the relay device 115 in order to avoid blocking the relay device's receiver or causing interference with other users. Hence, in contrast to symmetric systems, there is no known mechanism for the UE 120 to transfer either acknowledgement/negative acknowledgement (ACK/NACK) or channel quality information (CQI) from the UE 120 to the base station 105.

Therefore, there is a need for an uplink-only relaying system to be able to better control communications from a terminal device, such as an MTC device, via a relay device, for example for the transportation of information carried on PUCCH that is subsequently relayed by the MTC relay device to a base station.

SUMMARY OF THE INVENTION

The present invention provides communication units, integrated circuits and methods of operation at such communication units in a communication system that supports a terminal device communicating with a base station via a relay device, as described in the accompanying claims. Specific embodiments of the invention are set forth in the dependent claims. These and other aspects of the invention will be apparent from and elucidated with reference to the embodiments described hereinafter.

DETAILED DESCRIPTION

The following description focuses on embodiments of the invention applicable to a 3rd generation partnership project (3GPP™) cellular communication system. However, it will be appreciated that the invention is not limited to this particular cellular communication system, but may be applied to any cellular communication system.

Figure 1:
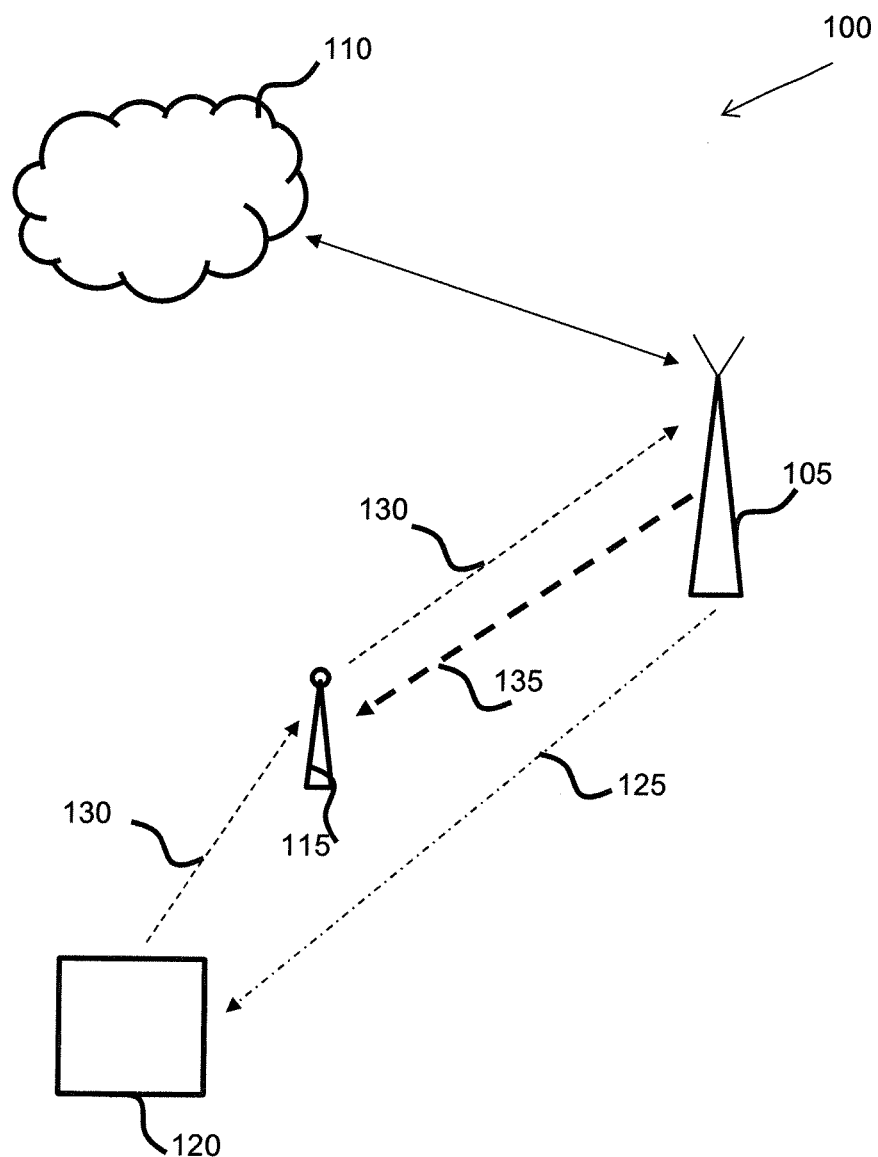
FIG. 1 illustrates a simplified schematic of an uplink-only, single-hop communications system.
Figure 2:
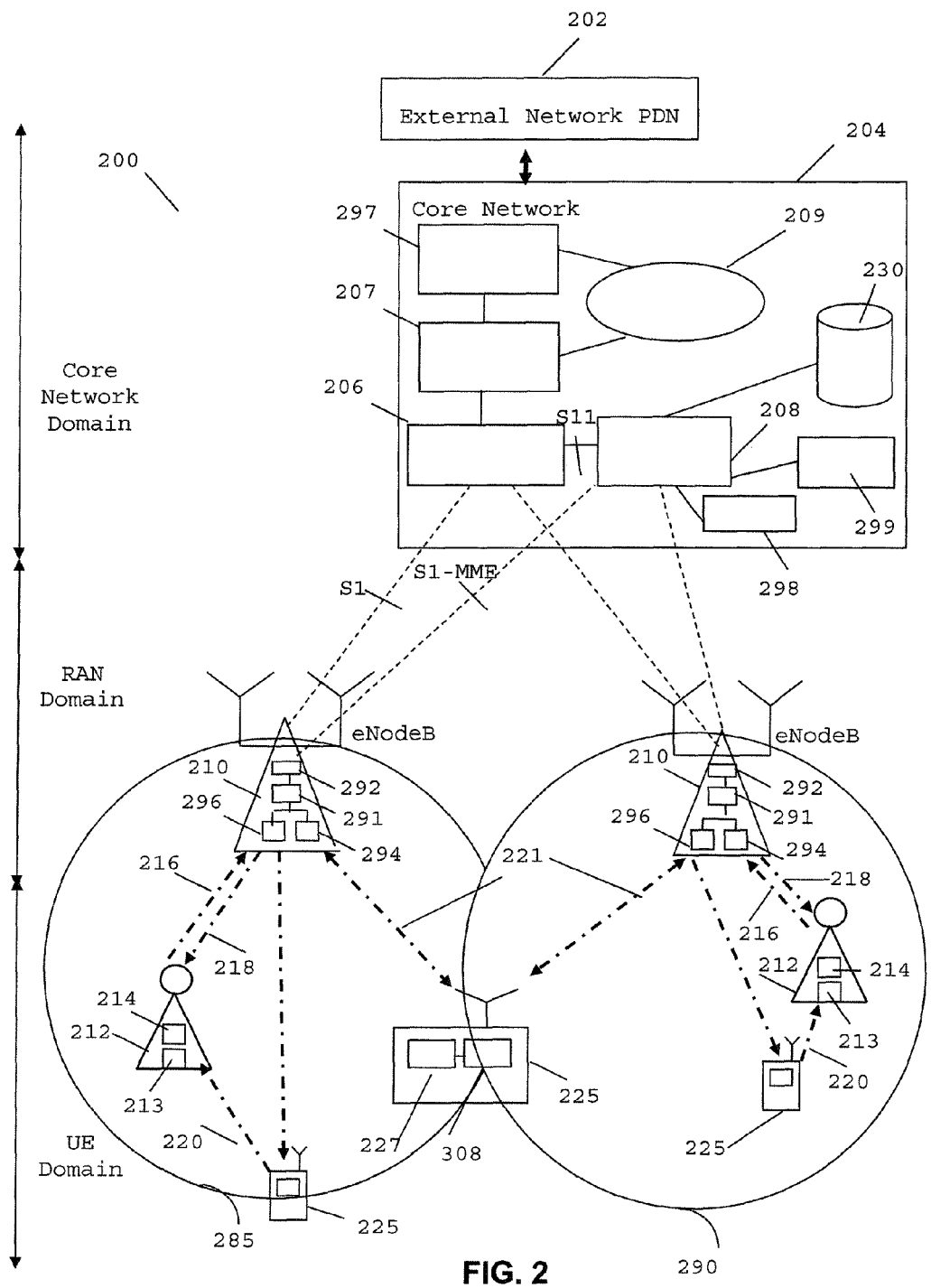
FIG. 2 illustrates a 3GPP™ LTE cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW may be coupled to a content provider 209. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

In example embodiments, the Gateway 206 may be a Serving Gateway (S-GW). The Gateway 206 is coupled to a mobility management entity MME 208 via an S11 interface. The MME 208 is operable to manage session control of Gateway bearers and is operably coupled to a home subscriber service (HSS) database 230 that is arranged to store subscriber communication unit 225 (user equipment (UE)) related information. As illustrated, the MME 208 also has a direct connection to each eNodeB 210, via an S1-MME interface.

The HSS database 230 may store UE subscription data such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as functions relating to bearer management (which may include the establishment, maintenance and release of bearers), functions relating to connection management (which may include the establishment of the connection and security between the network and the UE 225) and functions relating to inter-working with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207 from one or more content providers 209 or via the external PDN 202. The MME 208 may be further coupled to an evolved serving mobile location center (E-SMLC) 298 and a gateway mobile location center (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

If the Gateway 206 comprises an S-GW, the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies, such as GPRS™ and UMTS™.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature). Each of the UEs 225 comprise a transceiver unit 227 operably coupled to signal processing logic 308 (with one UE illustrated in such detail for clarity purposes only). The system comprises many other UEs 225 and eNodeBs 210, which for clarity purposes are not shown.

As illustrated, each eNodeB 210 comprises one or more wireless transceiver (transmitter and/or receiver) unit(s) 294 that is/are operably coupled to a control processor 296 and memory 292 for storing, inter alia, information relating to UEs and UE capabilities, for example whether the UE is able to, or may be required to, operate in an extended coverage mode via a relay device, such as relay device 212. Each eNodeB 210 further comprises a scheduler 291, which may be operably coupled to the one or more wireless transceiver unit(s) 294, the control processor 296 and memory 292.

In example embodiments of the present invention, a control processor of a network element, such as control processor 296 of eNodeB 210, is arranged to transmit a signal to a wireless communication unit, such as UE 225, and receive communications back from the UE, either direct or via a relay device.

Further, as illustrated, in some instances UEs 225 may be served by relay devices 212. In this example embodiment, relay devices 212 are asynchronous relay devices, allowing information to, at least, be relayed from UEs 225 to eNodeBs 210, without necessarily providing the reverse communication link of forwarding communication from the eNodeBs 210 to the UEs 225. In part, this relay device asynchronous mode of operation is a result of the transmit power and receiver sensitivity of the eNodeBs 210 being greater than the transmit power and receiver sensitivity of the UEs 225. In this manner, the eNodeBs may transmit signals on the downlink (DL) path to the UEs 225 located at the edge of its communication coverage direct, whereas the UE's transmit power may be insufficient to achieve the corresponding uplink (UL) communication to the eNodeB.

Here, the asynchronous relay device 212 assists (i.e. relays) the UL communication from the UE 225 to the corresponding eNodeB 210. In this example embodiment, relay devices 212 comprise, at least, control processor 213 operably coupled to a transceiver (not shown) and a memory device 214. In some examples, the control processor 213 may be located on an integrated circuit (not shown). In example embodiments, relay device 212 is configured to receive a wireless communication signal 220 from UE 225 and selectively relay this wireless communication signal 216 to eNodeB 210. In some instances, relay device 212 may receive wireless communication signals 218 from eNodeB 210. In some example embodiments, relay devices 212 may modify a received wireless communication signal 220 before relaying 216 to eNodeB 210. In other example embodiments, relay devices 212 may be controlled via eNodeB 210 via, say, wireless communication signal 218. In yet further example embodiments, relay devices 212 may be operable to determine information independently of eNodeB 210.

Clearly, the various components within the eNodeB 210, UE 225 and/or relay device 212 can be realized in discrete or integrated component form, with an ultimate structure therefore being an application-specific or design selection. Further, although example embodiments of the invention have been described with reference to an evolved NodeB (eNodeB), UE 225 and relay device 212, it should be apparent to a skilled person that example embodiments of the invention could be utilised with any base station (or other network element), terminal device or communication relay device.

Figure 3:
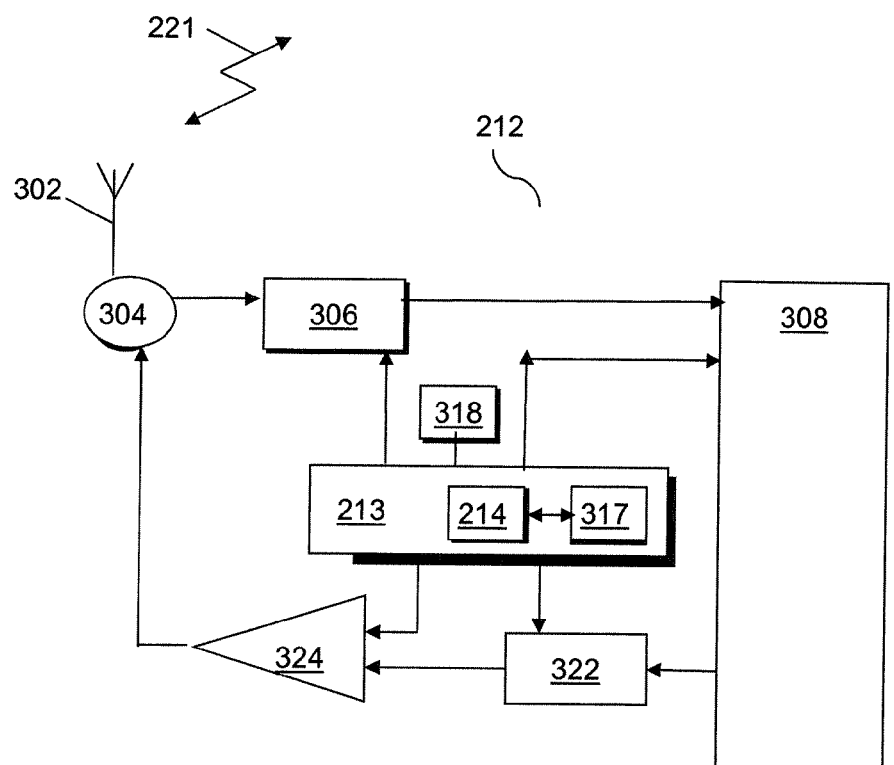
FIG. 3 illustrates an example block diagram of a 3GPP™ LTE user equipment adapted in accordance with some example embodiments of the present invention.

Referring now to FIG. 3, a block diagram of a relay device, adapted in accordance with some example embodiments of the invention, is shown. The relay device 212 contains an antenna 302 coupled to antenna switch 304 that provides isolation between receive and transmit chains within the relay device 212. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realised by a digital signal processor (DSP)). A skilled artisan will appreciate that the level of integration of using receiver circuits or components may be, in some instances, implementation-dependent.

A control processor 213 maintains overall operational control of the relay device 212. The control processor 213 is also coupled to the receiver front-end circuitry 306 and the signal processing module 308. In some examples, the control processor 213 is also coupled to a buffer module 317 and a memory device 214 that selectively stores operating regimes, such as decoding/encoding functions, synchronization patterns, code sequences, and the like. In some examples, the relay device 212 may be a dummy repeater with much less functionality than that described above, leading to a much more simplified version of buffer module 317 and memory device 214. A timer 318 is operably coupled to the control processor 213 to control the timing of operations (transmission or reception of time-dependent signals) within the relay device 212.

As regards the transmit chain, this essentially includes an input module 320, coupled in series through transmitter/modulation circuitry 322 and a power amplifier 324 to the antenna, antenna array 302, or plurality of antennae. The transmitter/modulation circuitry 322 and the power amplifier 324 are operationally responsive to the control processor 213.

The signal processor module 308 and/or control processor 213 in the transmit chain may be implemented as distinct from the signal processor 308 and/or control processor 213 in the receive chain. Alternatively, a single processor may be used to implement a processing of both transmit and receive signals, as shown in FIG. 3. Clearly, the various components within the relay device 212 can be realized in discrete or integrated component form, with an ultimate structure therefore being an application-specific or design selection.

In one example aspect of the invention, the integrated circuit may be suitable for a relay device for supporting uplink communication between a terminal device and a base station. The integrated circuit may comprise a control processor arranged to: monitor a downlink communication from the base station to the terminal device; determine therefrom at least one uplink resource to be used by the terminal device; configure the at least one receiver to receive the at least one uplink resource; receive an uplink message on the at least one uplink resource; determine therefrom uplink control information used by the terminal device; modify the uplink message on the at least one uplink resource; and relay the uplink message to the base station.

In one example, the control processor may be arranged to relay the uplink message to the base station as a medium access layer re-transmission. the control processor is arranged to modify the uplink message on the at least one uplink resource by identifying the terminal device, for example by incorporating a C-RNTI into a control element of the uplink message, prior to relaying the uplink message to the base station.

In one example, the control processor may be further arranged to package transmitted ACK/NACK information into a control element of the received uplink message, for example where the relayed uplink message may not be associated with periodic transmissions from the terminal device.

In one example, the control processor may be arranged to determine from the uplink message HARQ ACK/NACK information associated with a previous physical downlink shared channel (PDSCH) transmission and/or channel quality information (CQI) associated with a subsequent physical downlink shared channel (PDSCH) transmission.

In one example, the control processor may be operable to process and relay the message received from the terminal device at a Medium Access Control (MAC) layer in a protocol stack.

In one example, the control processor may be arranged to monitor a downlink communication from the base station to the terminal device on a physical downlink control channel (PDCCH), for example to determine from the PDDCH at least one physical uplink control channel (PUCCH) resource from the terminal device.

In one example, the control processor may be arranged to receive an uplink message on the at least one uplink resource after the control processor has monitored a physical downlink shared channel (PDSCH) being used for a communication from the base station to the terminal device.

In one example, the control processor may be arranged to configure the at least one receiver to receive the at least one uplink resource; and receive an uplink message on the at least one uplink resource.

In one example the control processor may be arranged to: receive an uplink message from the terminal device on at least one of an uplink control channel or an uplink shared channel; determine from the uplink message physical layer signalling used by the terminal device; create a relay control element identifying the physical layer signalling; and transmit the relay control element to the base station.

As discussed above, a potential issue with an uplink only relaying system is that a relay device may be unable to communicate directly with a UE. An example of a potential problem with the abovementioned topology is illustrated in FIG. 4.

Figure 4:
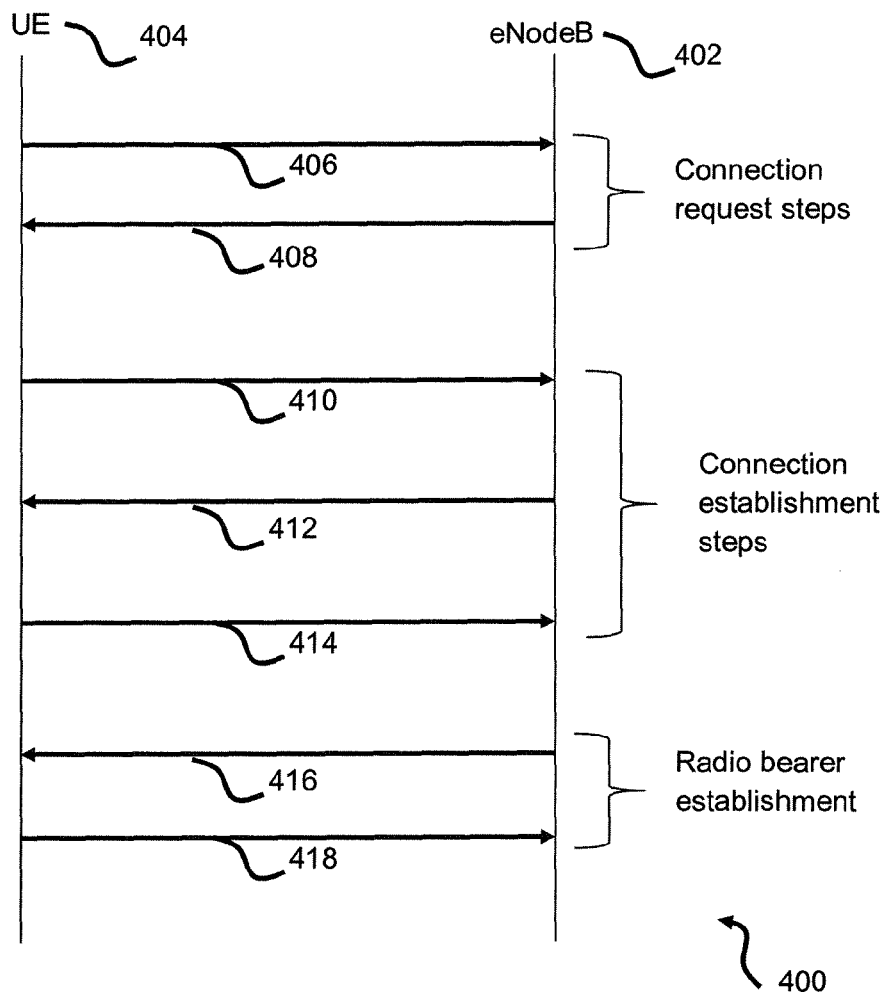
FIG. 4 illustrates a known simplified LTE message sequence chart comprising an eNodeB and a UE.

FIG. 4 illustrates a simplified example of a prior art LTE system 400 comprising an eNodeB 402 and a UE 404. In this example embodiment, UE 404 initiates a random access procedure by selecting an available random access preamble and transmitting this random access preamble 406 to the eNodeB 402. A random access response (RAR) 408 is transmitted by the eNodeB 402 in response to the initial random access preamble 406 transmission from the UE 404. Generally, the RAR 408 conveys the identity of the detected preamble 406, as well as a timing alignment instruction to synchronise subsequent uplink transmissions from the UE 404, an initial uplink resource grant for a message-3 transmission and an assignment of a temporary Cell Radio Network Temporary Identifier (C-RNTI). Next, the message-3 transmission 410, in this case a Radio Resource Control (RRC) connection request message, is transmitted by the UE 404 to the eNodeB 402. RRC connection establishment generally involves the establishment of a Signalling Radio Bearer 1 (SRB1) and the transfer of an initial uplink Non Access Stratum (NAS) message, which generally triggers the establishment of an S1-connection.

If the eNodeB 402 accepts the RRC connection request message 410, it returns an RRC Connection Setup message 412 that may include initial radio resource configuration information, including SRB1. The UE 404 may then be operable, in this example, to return an RRC connection complete message 414, which enables the eNodeB 402 to determine a network node (not shown) in which to establish an S1 connection. Further, the eNodeB 402 may transmit the NAS message contained in the 'RRC connection complete' message to a chosen MME on the S1 connection. Steps 406 and 408 can be viewed as connection request steps, whilst steps 410, 412 and 414 can be viewed as connection establishment steps.

Generally, the next step in this procedure is to establish a default data radio bearer. In this example embodiment, the eNodeB 402 transmits an RRC Connection Reconfiguration message 416, which can include a radio resource configuration that may be used to setup SRB2 and one or more data radio bearers (DRBs). In response to message 416, the UE 404 finally returns an RRC Connection Reconfiguration Complete message 418.

If the connection establishment procedure referred to in FIG. 4 is implemented with an uplink only relay system, a relay device (not shown) may not be aware of configuration messages transmitted between the UE 404 and eNodeB 402, and thus not be able to efficiently relay subsequent transmissions between the UE 404 and the eNodeB 402.

Figure 5:
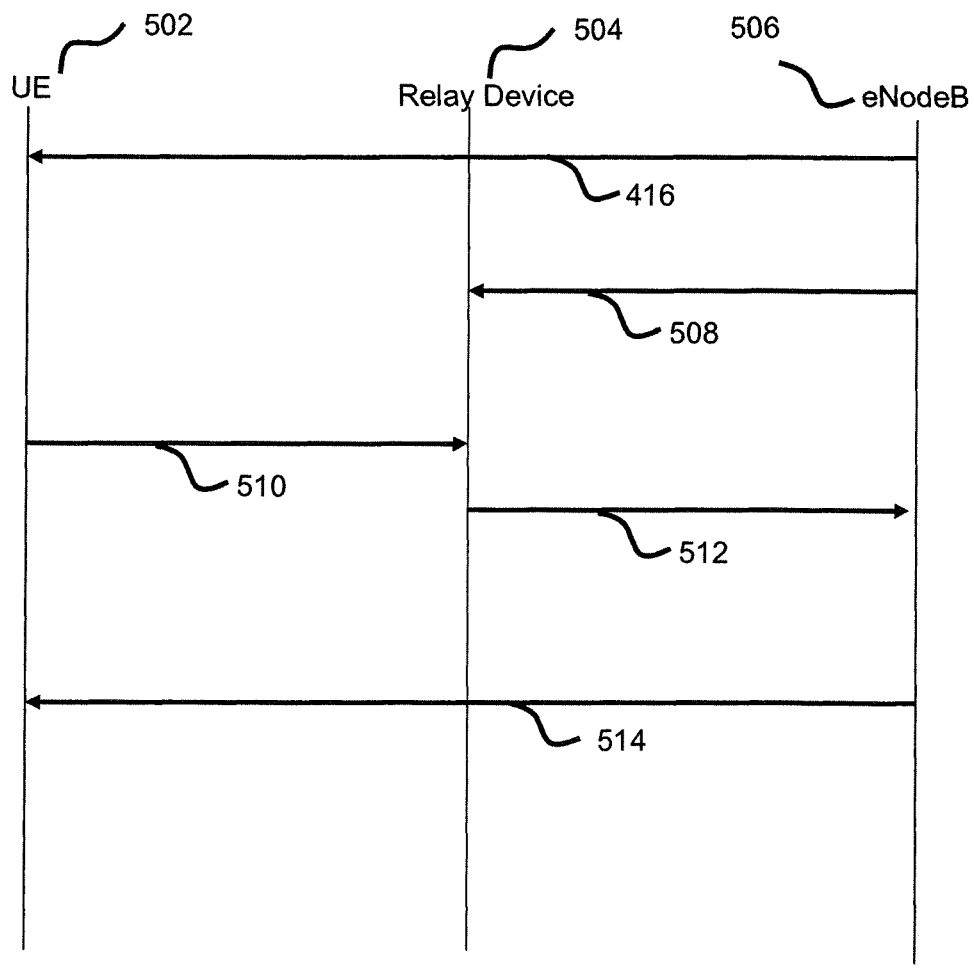
FIG. 5 illustrates a simplified example of a message sequence chart incorporating a relaying device.

An example of a potential issue with utilising the above procedure referred to in FIG. 4 with an uplink relay architecture is illustrated in FIG. 5. FIG. 5 illustrates a simplified message sequence chart between UE 502, relay device 504 and eNodeB 506. In FIG. 5, the messaging sequence begins with the RRC Connection Reconfiguration message 416 of FIG. 4 being sent from eNodeB 506 to UE 502, with earlier operations/steps being omitted to prevent repetition. RRC Connection Reconfiguration message 416, in this example, comprises, at least, information to allow SRB2 and a default DRB to be configured, as well as dedicated physical configuration information to inform UE 502 of appropriate physical resources to utilise. The relay device 504 is unaware of the eNodeB 506 transmitting the RRC Connection Reconfiguration message 416 directly to UE 502, and is, therefore, unable to configure itself to receive subsequent messages from UE 502 using the appropriate physical resources determined by eNodeB 506. Therefore, in this relay example, eNodeB 506 is operable to transmit at least one new or modified RRC message 508 to the relay device 504. This at least one additional RRC message 508 may be transmitted directly to the relay device 504, using the Physical Downlink Shared Channel (PDSCH), where the PDSCH resource(s) is/are indicated, for example, on the Physical Downlink Control Channel (PDCCH).

In another example embodiment, instead of transmitting a new additional RRC message 508, a new information element (IE), for example within an existing RRC Connection Reconfiguration message, may be used. For example, either a new RRC message 508, such as a relay node configure message, may be transmitted to the relay device 504, or a currently defined RRC reconfiguration message may be transmitted that contains a new IE identifying relay information.

In another example embodiment, the relay device 504 may be made aware of PUCCH resources allocated to the UE 502 by the eNodeB 506 via a different method to those disclosed previously. For example, the relay device 504 may be operable to monitor the eNodeBs 506 RRC Connection Setup message 412 (from FIG. 4), which is generally transmitted unencrypted by the eNodeB 506. It is therefore possible for the relay device 504 to use the configuration information provided by this message to configure itself to receive a PUCCH transmission from the UE 502 using the appropriate physical resources. A disadvantage with this method may be that if the PUCCH is reconfigured, for example after RRC Connection Reconfiguration message 416, the relay device 504 may not be able to determine this reconfiguration because subsequent RRC messages are usually encrypted. Therefore, it may be advantageous to utilise an additional RRC message 508 that is transmitted to the relay device 504, as shown.

In another example embodiment, the relay device 504 may be operable to decrypt RRC messages independently of the eNodeB 506. In yet further example embodiments, the relay device 504 may be operable to decrypt RRC messages after receiving a wireless communication from the eNodeB 506.

In this example embodiment, the additional RRC message 508 may contain, for example, the C-RNTI of the UE 502 and dedicated physical configuration information to allow the relay device 504 to determine the physical resource location of any physical uplink control channel (PUCCH) transmission from UE 502.

At this stage, in this example embodiment, the eNodeB 506 may at least have informed the UE 502, via RRC Connection Reconfiguration message 416, those physical resources to use, and informed the relay device 506, via additional RRC message 508, those physical resources that the UE 502 will be utilising. As a result of RRC Connection Reconfiguration message 416, the UE 502 may transmit a periodic PUCCH message 510, which may be intercepted by relay device 504, which should be set up correctly to receive periodic PUCCH messages from UE 502, based on additional RRC message 508. The relay device 504 may be operable to transmit medium access control (MAC) elements on conventional physical uplink shared channel (PUSCH) to the eNodeB 506 as message 512. In this example embodiment, the periodic PUCCH message 510 comprises a scheduling request. However, in other example embodiments, the periodic PUCCH message 510 may comprise one or more of the following:—

Hybrid Automatic repeat request (HARQ) ACKnowledgement (ACK)/Negative ACKnowledgement;

Channel State Information (CSI) comprising one or more of Channel quality indicator (CQI), Precoding matrix indicator (PMI); and Rank indicator (RI).

In the case of dedicated CQI reporting, the additional RRC message 508 may also contain information regarding periodic CQI reporting to enable the relay device 504 to configure itself at the appropriate times and/or in appropriate physical resources in order to receive the CQI from the UE 502 and relay this information to the eNodeB 506. In this case, a different additional RRC message 508 would be utilised.

In this example, the message transmitted to the relay device 504 may be a new message, or an existing message, for example, an RRC connection reconfiguration message with an additional IE, as mentioned previously. In either case, information transmitted to the relay device 504 may comprise one or more of the C-RNTI of the UE, a copy of CQI (and RI) configuration information that was transmitted to the UE in an associated eNodeB 506 to UE 502 message. In examples, this eNodeB 506 to UE 502 message may be the CQI-ReportConfig IE, as defined in 3GPP Technical Specification 36.311.

In this example embodiment, when a periodic PUCCH transmission 510 is received by the relay device 504, for which it is set up to receive, the relay device 504 generates a new MAC control element which may comprise a C-RNTI of the UE 502. In this example embodiment, the relay device 504 may additionally request and be granted uplink resources in order to transmit the PUSCH message 512, which may contain relayed CQI information (as originally transmitted using PUCCH), in this case relayed scheduling request message, to the eNodeB 506 in the same way as a conventional UE 502. In this example embodiment, the eNodeB 506 receives the PUSCH message 512, which may contain relayed CQI information (as originally transmitted using PUCCH), and responds by allocating uplink resources to the UE 502. In this example embodiment, the uplink grant is communicated directly to the UE 502 on PDCCH 514.

In another example embodiment, PUCCH transmission 510 may be aperiodic.

Figure 6:
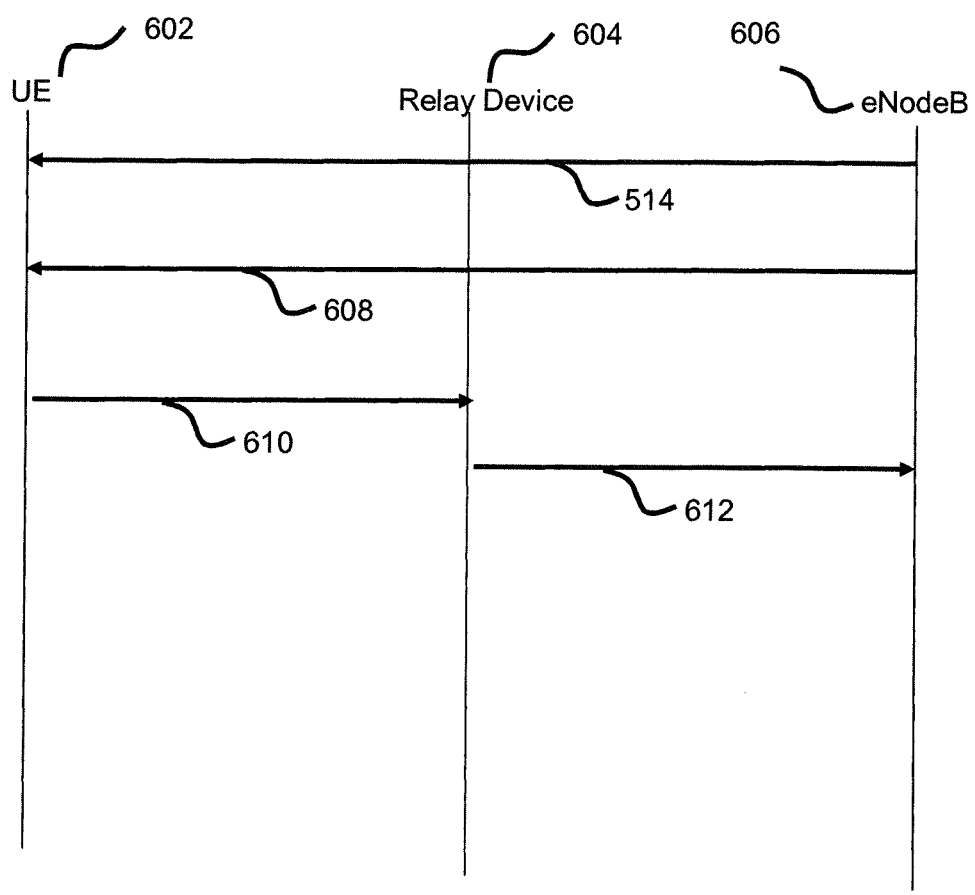
FIG. 6 illustrates a simplified example message sequence chart relating to aspects of the invention.

FIG. 6 illustrates a simplified example message sequence chart relating to another aspect of the invention. In this example embodiment, a PUCCH transmission from UE 602 is not necessarily associated with a periodic UE transmission 510 as in FIG. 5, but associated, for example, with an aperiodic transmission, which, in this example embodiment, is an ACK/NACK transmission. In this example embodiment, the message sequence chart begins with a downlink grant 514 communicated directly to the UE 602 from the eNodeB 606 using PDCCH, thus continuing from FIG. 5. However, in some examples, the actual ACK/NACK may also be carried on PUSCH if UL resources are granted to the UE when the ACK/NACK is to be sent.

It should be noted that this example embodiment should not be limited as a continuation of FIG. 5, and could be implemented by utilising a separate uplink grant independent of FIG. 5.

Furthermore, it should be noted that example embodiments illustrated as continuations of previous embodiments are only performed to simplify the description, and should not be seen as limiting sequential steps. Thus, each illustrated example embodiment is capable of being utilised independently of other example embodiments.

As discussed above, eNodeB 606 may communicate a downlink grant 514 directly to UE 602, for example allocating resources to the UE 602 on PDSCH via a PDCCH. In this example embodiment, relay device 604 receives the PDCCH intended for UE 602 and may be operable to determine when, and using what resources, a resultant PUCCH 610 may be transmitted by UE 602 containing HARQ ACK/NACK information associated with a subsequent PDSCH transmission 608.

In some examples, the PDCCH may have its cyclic redundancy check (CRC) scrambled using the C-RNTI of the UE that it is directed to. UEs may use this scrambled CRC to enable them to distinguish between PDCCHs that are intended for them, and PDCCHs that are not. Thus, in some examples, only PDCCHs intended for the particular UEs will CRC pass.

It is noted that standard UEs in the art would generally only look for a single C-RNTI. In order for relay device 604 to be able to 'sniff' PDCCHs that are intended for UEs that it is responsible for, the relay device 604 may have to attempt to test CRC using multiple C-RNTIs. In such examples, the multiple C-RNTIs may be the UEs that the relay device 604 is responsible for.

In other examples, the resultant PUUCH 610 may comprise any relevant parameter(s) associated with identifying a characteristic of the subsequent PDSCH transmission 608, and may not necessarily include HARQ or ACK/NACK information.

In response to this HARQ ACK/NACK information, the relay device 604 may be configured so that its uplink receiver is operable to receive the PUCCH 610 information. Unlike in FIG. 5, a separate additional RRC message 508 is not necessarily required to be sent to the relay device 604. This is because the PDCCH message 514 is not generally encrypted, unlike subsequent RRC connection messages. Therefore, the relay device 604 may be operable to monitor PDCCH transmissions without encryption issues arising. Subsequently, the eNodeB 606 transmits PDSCH 608 to UE 602, which implicitly informs the UE what resource is used to send the PUCCH that may contain HARQ ACK/NACK information associated with the PDSCH transmission 608. In response to message 608, UE 602 may transmit HARQ ACK/NACK on PUCCH 610 to relay device 604, which, due to a correctly configured uplink receiver, may be operable to relay this information to the eNodeB 606 as a relayed ACK/NACK control element 612. The eNodeB 606 may be operable to receive this relayed transmission 612, which may indicate the C-RNTI of the UE 602 and the ACK/NACK MAC control element.

In order for the relay device 604 to be operable to relay uplink control information sent on PUCCH/PUSCH, it may be necessary for the relay device 604 to decode the PUCCH/PUSCH transmissions to obtain the physical layer signalling. In some examples, it may be possible for the PUSCH to contain ACK/NACK and CQI information. A MAC control element may then be used to transfers this signalling information. An example of a MAC relay control element, for example, relayed uplink control information (UCI) message, may be:

a UE identifier (ID), say a UE's C-RNTI;
SR (e.g. 1 bit);
HARQ ACK/NACK length field (e.g. maximum 2 bits in the payload);
HARQ ACK payload;
CSI length field (up to 20 bits in the payload);
CSI payload.

When a PUCCH/PUSCH transmission is received by relay device 604 in relation to UE 602 for which it is responsible, it may generate a new MAC control element, for example a 'Relayed uplink control information (UCI)' message 612 that, in some examples, may contain a C-RNTI of the UE 602. Note that in the PUSCH case, a new MAC control element may only be generated if the PUSCH contains uplink control information. Note also that the relay device 604 may request and be granted uplink resources in order to send the relayed ACK/NACK message 612 to the eNodeB 606 in the same way as a conventional UE. In examples, uplink control information may comprise physical layer signalling, or any of the abovementioned parameters.

The following simplified illustrated examples provide a description of protocol stacks in an uplink-only relaying scenario, and a description of how these protocol stacks may operate and interact when relaying of PUCCH/PUSCH transmissions may occur.

Figure 7:
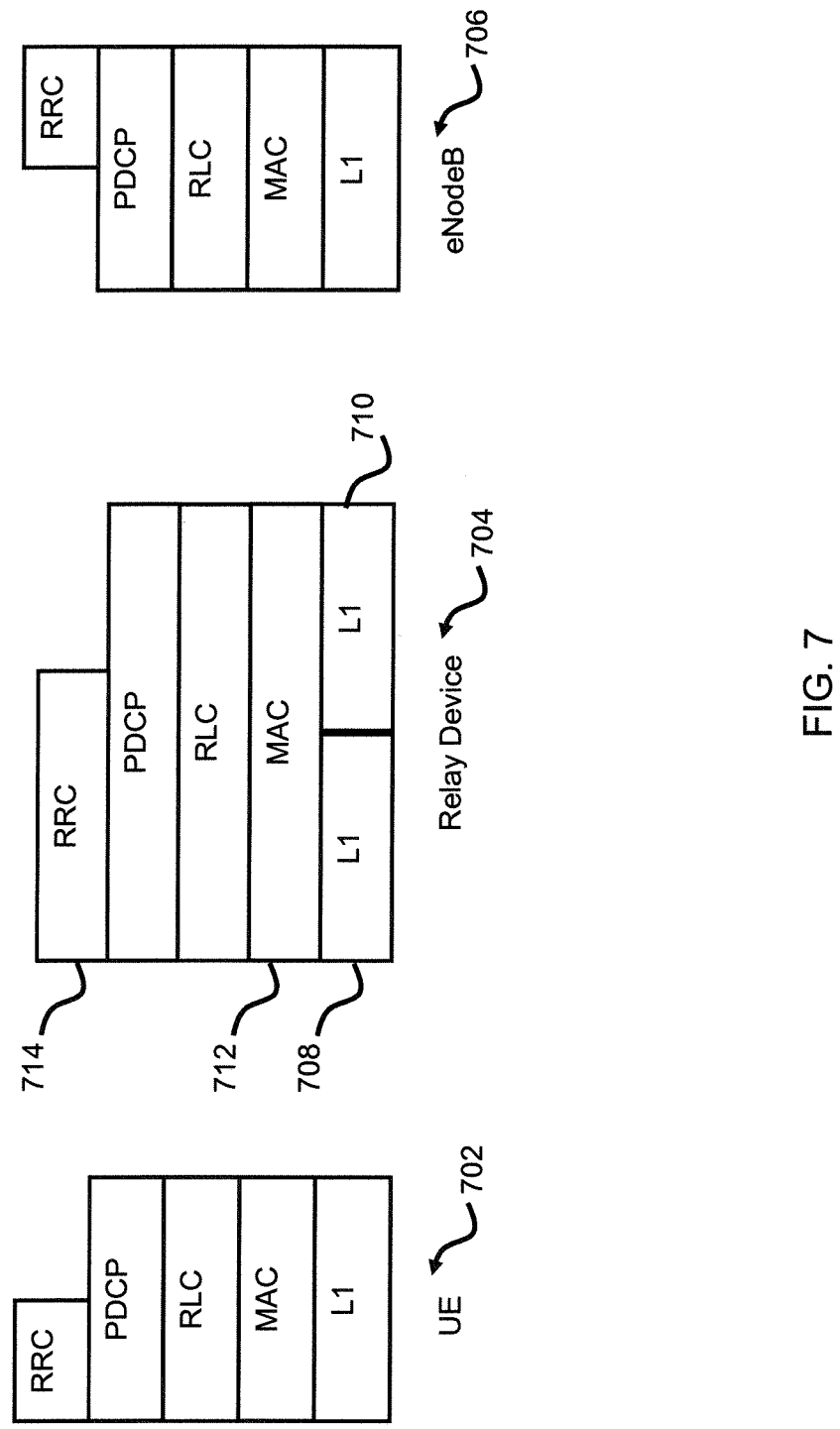
FIG. 7 illustrates a simplified example of UE, relay device and eNodeB protocol stacks, according to aspects of the invention.

FIG. 7 illustrates a simplified example of the OSI protocol stacks employed in UE 702, relay device 704 and eNodeB 706, according to aspects of the invention. In this illustrated example, only the main differences between the operation of the conventional protocol stacks are described, which in this example relate to relay device 704. In this example embodiment, PDCP and RLC layers of relay device 704 are conventional. Layer 1 708 is operable to receive only uplink data from a UE, in this example embodiment UE 702. In this example embodiment, Layer 1 708 may not be a conventional layer 1, as it may not be able to transmit or relay downlink data. Layer 1 710 may be a conventional layer 1. MAC layer 712, in this example embodiment, may comprise additional functionality for relaying information from the UE 702, for example new MAC control elements. RRC layer 714, in this example, may comprise additional functionality to include instruction messages required for relaying.

Figure 8:
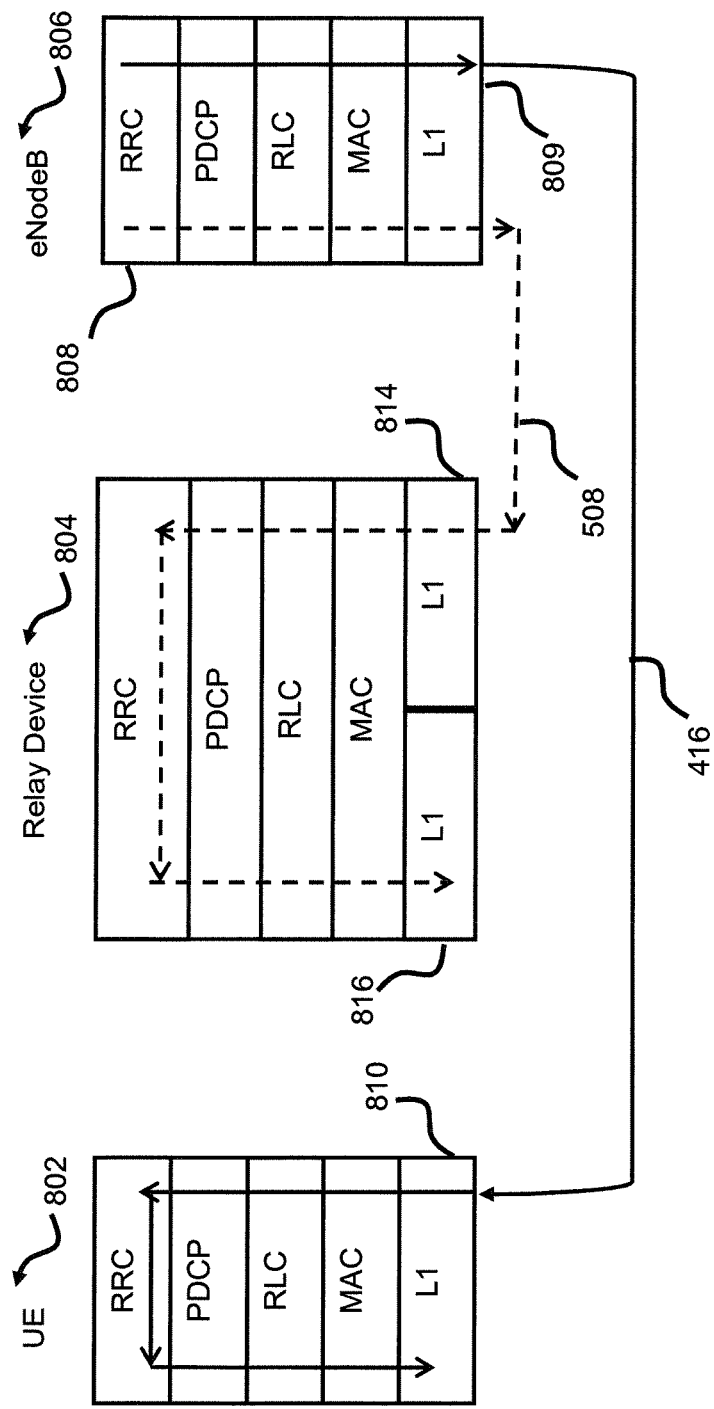
FIG. 8 illustrates a simplified example of protocol stacks illustrating how a relay device may be configured in order that PUCCH periodic relaying can be effected.

FIG. 8 shows an example of a simplified protocol stack illustrating how relay device 504 in FIG. 5 may be configured in order that PUCCH periodic relaying can be effected. FIG. 8 illustrates the first part of FIG. 5, which, in this example embodiment, involves messages 416 and 508 of FIG. 5. Initially, in this example embodiment, eNodeB 806 is operable to transmit a periodic PUCCH configuration in two separate RRC messages, from within RRC layer 808. The first RRC message 416, in this example embodiment, is transmitted directly to the UE 802, via L1 809, without being received by relay device 804. The first RRC message 416, in this example embodiment, is an RRC Connection Reconfiguration Message, which is received by the UE 802 at its L1 layer 810, before propagating through the UE 802 protocol stack and configuring the UE 802 to transmit periodic PUCCH messages utilising dedicated physical configuration information defined by eNodeB 806. The second RRC message 508, in this example embodiment, may be an additional RRC message used to configure relay device 804. The second RRC message 508 is transmitted by eNodeB 806, via L1 809, and received by conventional L1 layer 814, which corresponds to L1 layer 710 of FIG. 7. Second RRC message 508 is operable to propagate up through the relay device's 804 protocol stack wherein the second RRC message 508 is decoded, enabling the relay device 804 to configure its uplink receive layer 1 816, by utilising appropriate physical resources, to receive subsequent periodic PUCCH from UE 802. In this example, the relay device's protocol stack may be an RRC stack that supports conventional RRC functionality as well as additional RRC messages associated with relaying.

Figure 9:
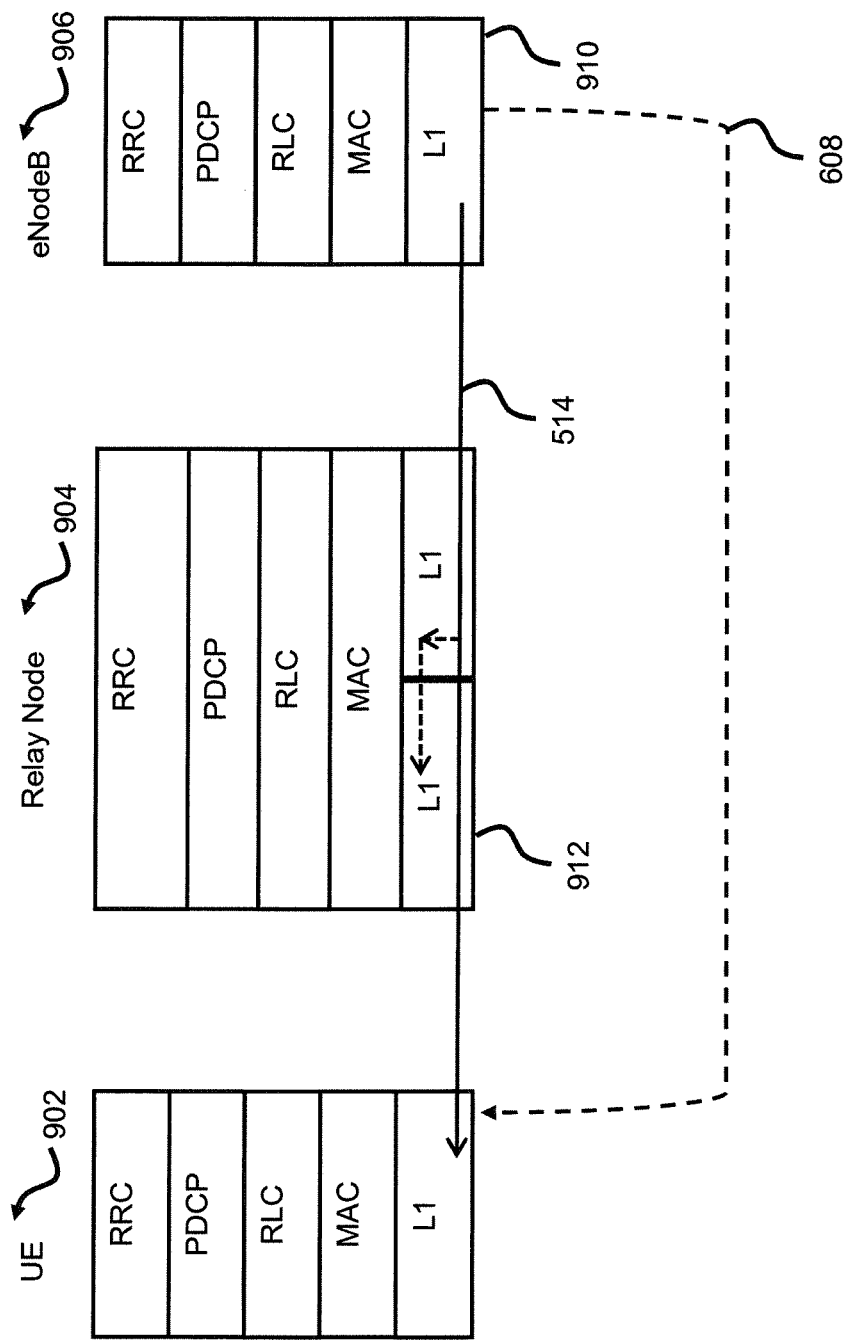
FIG. 9 illustrates a simplified example of protocol stacks illustrating how a relay device may be configured to receive PUCCH carrying ACK/NACK information associated with PDSCH transmission.
Figure 10:
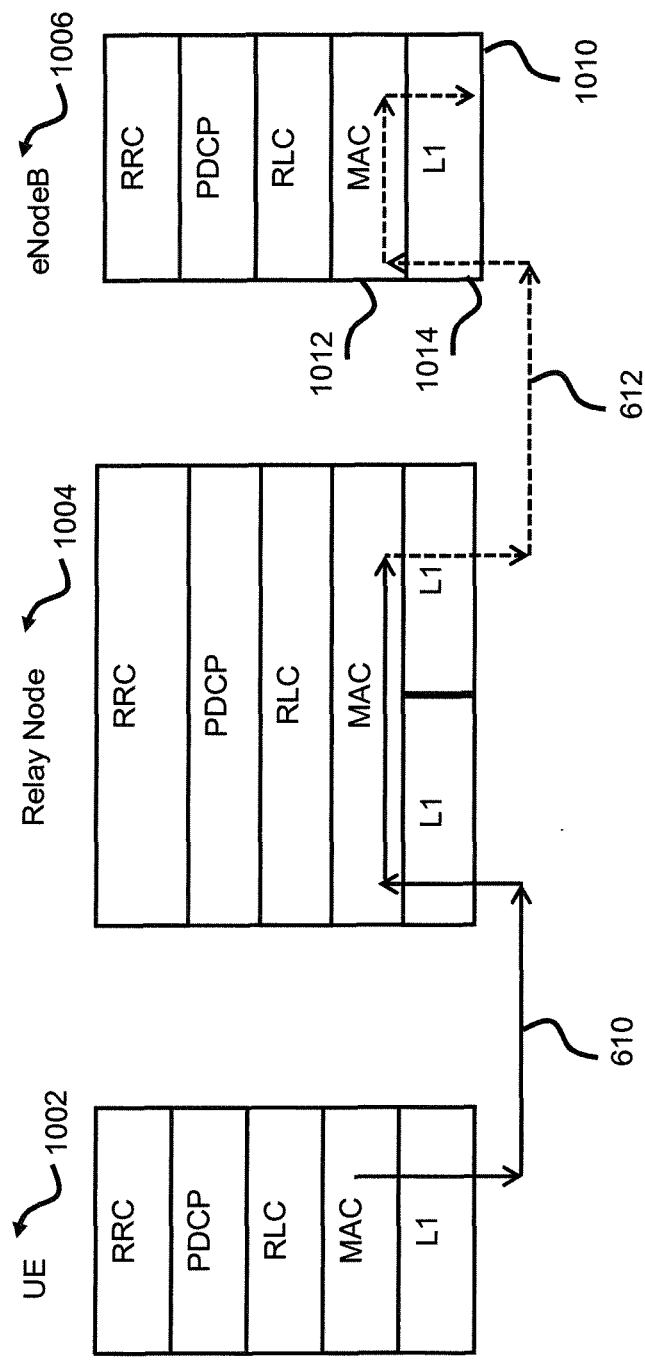
FIG. 10 illustrates a further simplified example of protocol stacks illustrating how a relay device may be configured to receive PUCCH carrying ACK/NACK information associated with PDSCH transmission.

FIGS. 9 and 10 illustrate examples of simplified protocol stacks illustrating how relay device 604 in FIG. 6 is configured to receive PUCCH carrying ACK/NACK information associated with PDSCH transmission.

FIG. 9 illustrates an example simplified protocol stack use relating to the first part of the operation of FIG. 6 which, in this example embodiment, involves messages 514 and 608 of FIG. 6. Initially, eNodeB 906 is operable to transmit a PDCCH 514 from Layer 1 910 of eNodeB 906, which is destined for UE 902. Relay device 904 is operable to monitor and receive the PDCCH 514 intended for UE 902, and is further operable to determine, from the PDCCH transmission 908, when, and in what resources, a resultant PUCCH will/may be transmitted by the UE 902. The relay device 904 is operable to set up its uplink receiver 912, in order to receive subsequent PUCCH transmissions from UE 902. Subsequently, UE 902 is operable to receive PDCCH transmission

514, which allocates UE PDSCH 608 resources. PUCCH may be transmitted by UE 902 in implied resources after PDSCH 608 has been received.

FIG. 10 illustrates an example simplified protocol stack use relating to the second part of FIG. 6, which, in this example embodiment, involves messages 610 and 612 of FIG. 6. In response to a received PDSCH 608, UE 1002 is operable to transmit PUCCH 610 carrying ACK/NACK information to relay device 1004. Upon receipt of PUCCH 610, the relay device 1004 is operable to package the transmitted ACK/NACK information from PUCCH 610 into a MAC control element together with the C-RNTI of UE 1002. The relay device 1004 is further operable to transmit this MAC control element on conventional PUSCH 612. Subsequently, the eNodeB 1006 is operable to receive PUSCH transmission 612 from relay device 1004 and is further operable to route at least one MAC protocol data unit (PDU) to the MAC layer 1012 of eNodeB 1006. The MAC layer 1012 is operable to decode the MAC control element transmitted on PUSCH 612, which includes the C-RNTI of UE 1002. MAC layer 1012 informs L1 1014 of the ACK/NACK information for UE 1002.

It will be appreciated that description of some example embodiments may refer to single message transmissions. It should be understood that reference to single message transmissions may be to allow simplification of some example embodiments, and should not be seen as a limiting feature. Furthermore, the description of embodiments relating to ACK/NACK information should not be seen as limiting. Any periodic or aperiodic information transmitted within PUCCH may possibly be used, for example, where aperiodic CQIs are requested. In this example, a PDCCH message with an UL (e.g. PUSCH) grant, together with an indication that a CQI is requested, may be received by a UE. This may result in a PUSCH transmission comprising CQI (that is a form of UCI). A relay device may, in some examples, detect the PDCCH, receive the PUSCH, and create a MAC control element with the CQI contained within it. This may then be forwarded to an eNodeB.

Figure 11:
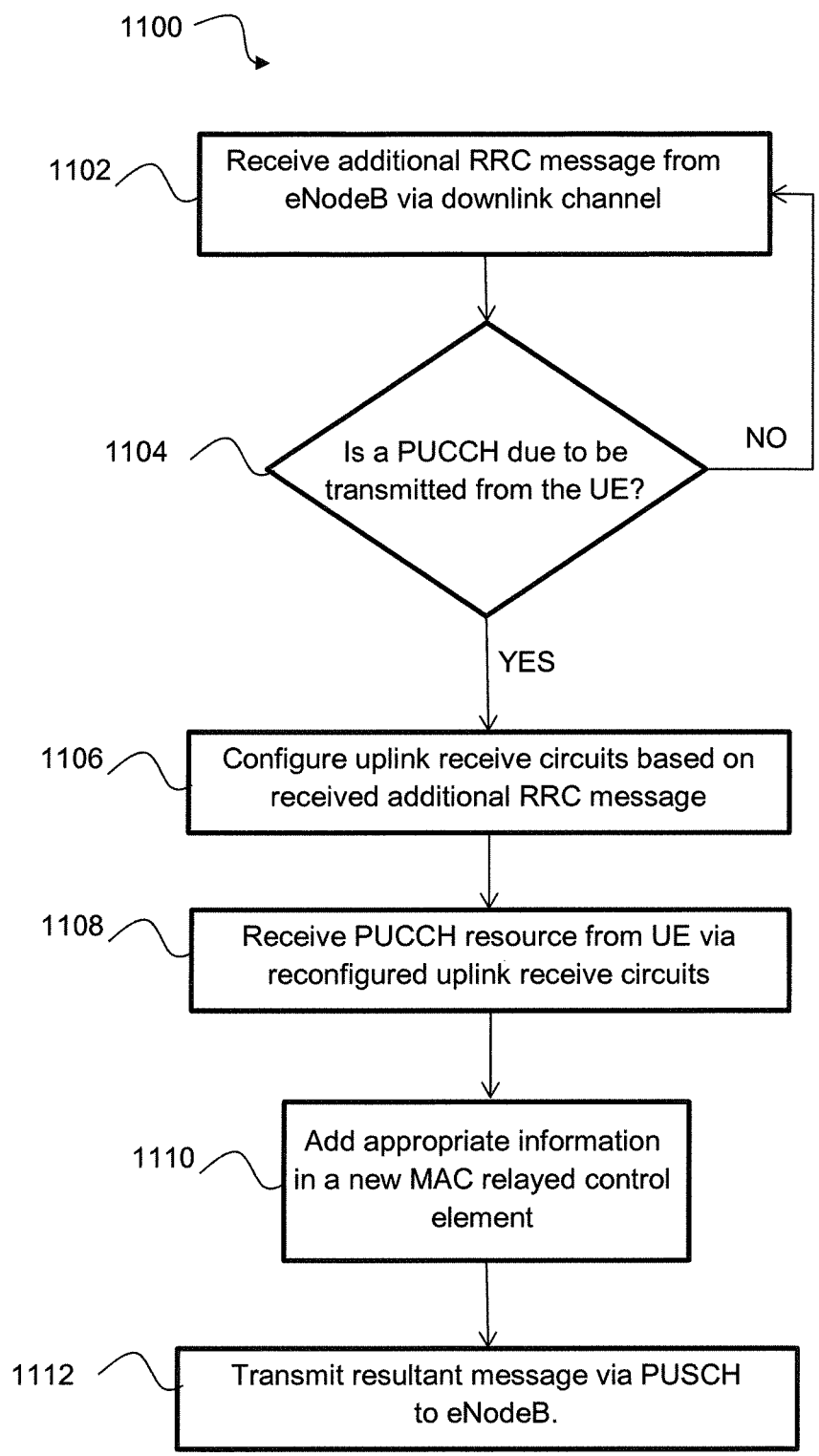
FIG. 11 illustrates an example of a simplified flow chart of a relay device's operation.

FIG. 11 illustrates an example of a simplified flow chart 1100 of a relay device's operation, utilising example aspects of the invention. In this example, when an eNodeB transmits PUCCH configuration information to a UE via an RRC message, an additional RRC message is transmitted to relay device and received at step 1102. In 1104, the relay device determines, from the received additional RRC message, whether a resultant PUCCH is to be transmitted from the UE. If the relay device determines that there is a PUCCH transmission, the relay device may configure its uplink receive circuits based on information obtained from the received additional RRC message. In practice, the RRC message will configure a periodic PUCCH, which will occur throughout the lifetime of the UE call (or until the eNodeB sends another RRC Connection reconfiguration that removes or modifies the periodic PUCCH. If the relay device determines that there is not going to be a resultant PUCCH transmission from the UE, the relay device returns to 1102. At 1108, the relay device receives the resultant PUCCH resource from the UE via its reconfigured uplink receive circuits. At 1110, the relay device may add appropriate information in a new MAC relayed control element, before transmitting to the eNodeB on PUSCH at 1112. In this example, the appropriate information may comprise appropriate UE C-RNTI. Further, in this example, the control element may comprise a scheduling request. In another example embodiment, the control element may comprise any periodic control element.

Figure 12:
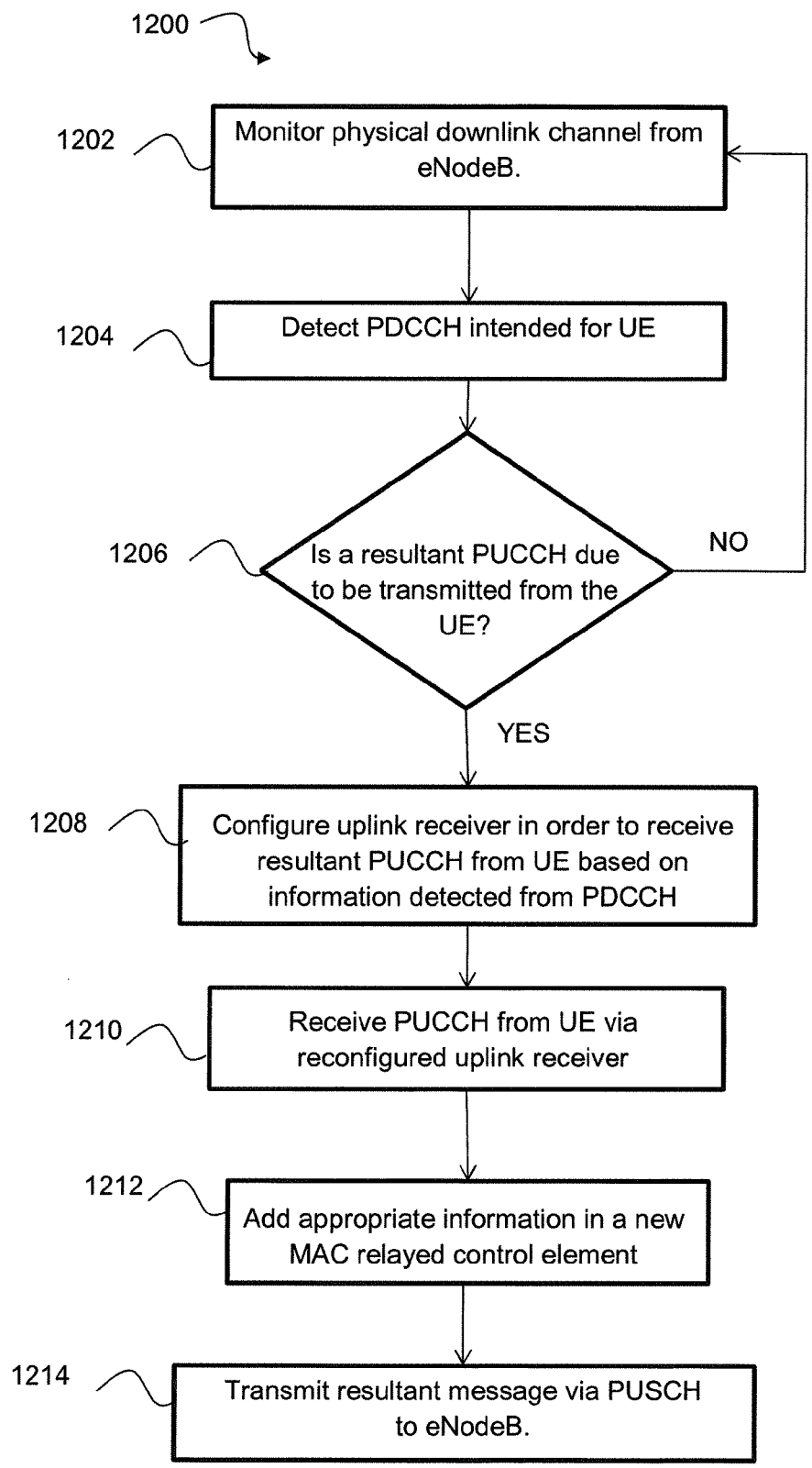
FIG. 12 illustrates an example of a further simplified flow chart of a relay device's operation.

FIG. 12 illustrates an example of a further simplified flow chart 1200 of a relay device's operation, utilising additional aspects of the invention. In this example, the relay device may be operable to receive aperiodic control elements. In this example, the relay device may not receive a dedicated additional RRC message from an eNodeB. Therefore, in this example embodiment at 1202, the relay device may be operable to monitor the physical downlink channel of the eNodeB. In this manner, at 1204, the relay device detects a PDCCH transmission from the eNodeB that is destined for a UE. The relay device, at 1206, determines whether there is a resultant PUCCH transmission that is due to be transmitted by the UE. If the relay device determines that there is to be a resultant PUCCH transmission from the UE, the relay device may configure its uplink receiver at 1208, based on information detected from PDCCH in 1204 and 1206, in order to receive and correctly decode the resultant PUCCH from the UE.

If the relay device determines that there is not going to be a resultant PUCCH transmission, the relay device returns to 1202.

Alternatively, at 1210, the relay device receives the resultant PUCCH transmission from UE via its reconfigured uplink receiver. At 1212, the relay device may, in some examples, add appropriate information in a new MAC relayed control element, before transmitting to the eNodeB on PUSCH at 1214. In this example, the appropriate information may comprise appropriate UE C-RNTI. Further, in this example, the control element may comprise a ACK/NACK information. In another embodiment, the control element may comprise any aperiodic control element.

Figure 13:
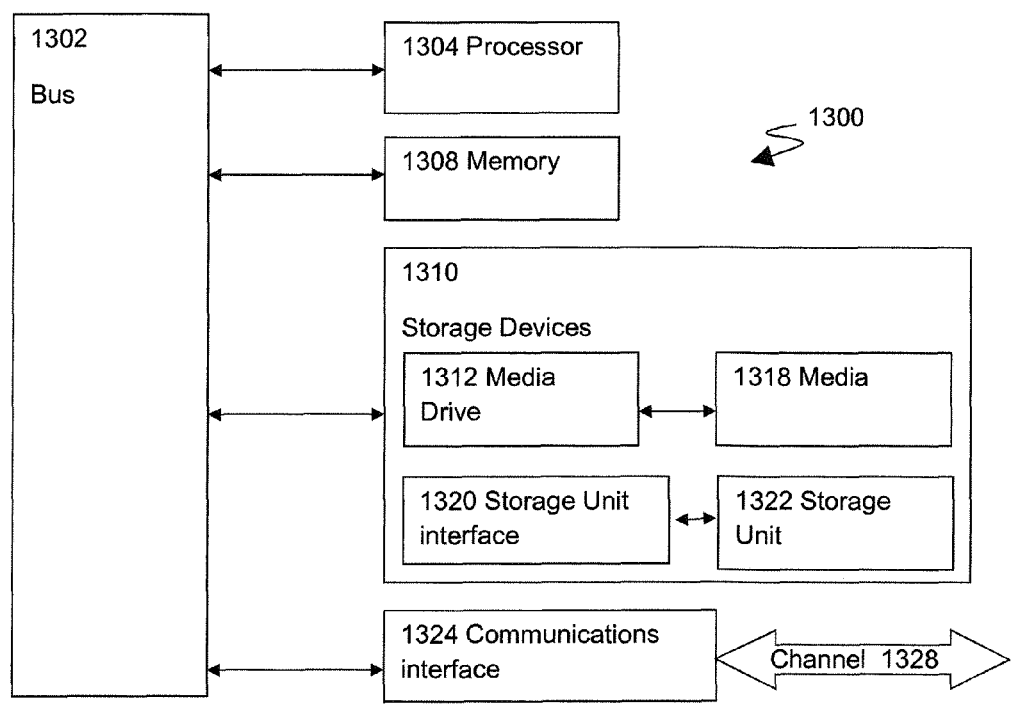
FIG. 13 illustrates a typical computing system that may be employed to implement software controlled relaying of information.

Referring now to FIG. 13, there is illustrated a typical computing system 1300 that may be employed to implement software controlled relaying of information in embodiments of the invention. Computing systems of this type may be used in wireless communication units, such as first or second wireless network elements. Those skilled in the relevant art will also recognize how to implement the invention using other computer systems or architectures. Computing system 1300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1300 can include one or more processors, such as a processor 1304. Processor 1304 can be implemented using a general or special-purpose processing engine such as, for example, a microprocessor, microcontroller or other control logic. In this example, processor 1304 is connected to a bus 1302 or other communications medium.

Computing system 1300 can also include a main memory 1308, such as random access memory (RAM) or other dynamic memory, for storing information and instructions to be executed by processor 1304. Main memory 1308 also may be used for storing temporary variables or other intermediate information during execution of instructions to be executed by processor 1304. Computing system 1300 may likewise include a read only memory (ROM) or other static storage device coupled to bus 1302 for storing static information and instructions for processor 1304.

The computing system 1300 may also include information storage system 1310, which may include, for example, a media drive 1312 and a removable storage interface 1320. The media drive 1312 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1318 may include, for example, a hard disk, floppy disk, magnetic tape, optical disk, CD or DVD, or other fixed or removable medium that is read by and written to by media drive 1312. As these examples illustrate, the storage media 1318 may include a computer-readable storage medium having particular computer software or data stored therein.

In alternative embodiments, information storage system 1310 may include other similar components for allowing computer programs or other instructions or data to be loaded into computing system 1300. Such components may include, for example, a removable storage unit 1322 and an interface 1320, such as a program cartridge and cartridge interface, a removable memory (for example, a flash memory or other removable memory module) and memory slot, and other removable storage units 1322 and interfaces 1320 that allow software and data to be transferred from the removable storage unit 1318 to computing system 1300.

Computing system 1300 can also include a communications interface 1324. Communications interface 1324 can be used to allow software and data to be transferred between computing system 1300 and external devices. Examples of communications interface 1324 can include a modem, a network interface (such as an Ethernet or other NIC card), a communications port (such as for example, a universal serial bus (USB) port), a PCMCIA slot and card, etc. Software and data transferred via communications interface 1324 are in the form of signals which can be electronic, electromagnetic, and optical or other signals capable of being received by communications interface 1324. These signals are provided to communications interface 1324 via a channel 1328. This channel 1328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1308, storage device 1318, or storage unit 1322. These and other forms of computer-readable media may store one or more instructions for use by processor 1304, to cause the processor to perform specified operations. Such instructions, generally referred to as 'computer program code' (which may be grouped in the form of computer programs or other groupings), when executed, enable the computing system 1300 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1300 using, for example, removable storage drive 1322, drive 1312 or communications interface 1324. The control logic (in this example, software instructions or computer program code), when executed by the processor 1304, causes the processor 1304 to perform the functions of the invention as described herein.

In one example, a tangible non-transitory computer program product comprises executable program code operable for, when executed at the first wireless network element: intercepting a communication from the wireless communication unit to a second network element; decoding the communication to determine whether the communication relates to a request for a first item of information; requesting the first item of information from the data store, wherein the control processor is further arranged to not forward the request for the first item of information to the second network element if it is determined that first item of information is stored in the data store; receiving the first item of information from the data store; and transmitting the first information to the wireless communication unit.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, the program code may be operable for, at a relay node: monitoring a downlink communication from the base station to the terminal device; determining therefrom at least one uplink resource to be used by the terminal device; configuring at least one receiver of the relay device to receive the at least one uplink resource; receiving an uplink message on the at least one uplink resource; determining therefrom uplink control information used by the terminal device; modifying the uplink message on the at least one uplink resource; and relaying the uplink message to the base station.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processor 308 and control processor 213 have been illustrated and described as a single processing module, whereas in other implementations they may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A relay device for supporting uplink communication between a terminal device and a base station, the relay device comprising:
    at least one receiver;
    a control processor, operably coupled to the at least one receiver and arranged to:
    monitor a downlink communication from the base station to the terminal device;
    determine therefrom at least one uplink resource to be used by the terminal device;
    configure the at least one receiver to receive the at least one uplink resource;
    receive an uplink message on the at least one uplink resource;
    determine therefrom uplink control information used by the terminal device;
    modify the uplink message on the at least one uplink resource; and
    relay the uplink message to the base station.

2. The relay device of claim 1 wherein the control processor is arranged to relay the uplink message to the base station as a medium access layer re-transmission.

3. The relay device of claim 1 wherein the control processor is further arranged to determine from the uplink message physical layer signalling used by the terminal device.

4. The relay device of claim 3 wherein the control processor is further arranged to create a relay control element identifying the physical layer signalling.

5. The relay device of claim 4 wherein the relay control element is incorporated into a relayed uplink control information (UCI) message.

6. The relay device of claim 4 wherein the relay control element comprises at least one from a group of:
    a terminal device identifier;
    signalling radio bearer identifier;
    Hybrid Automatic repeat request (HARQ) ACKnowledgement (ACK)/Negative ACKnowledgement length field indication;
    HARQ ACK payload;
    Channel State Information (CSI) length field indication;
    CSI payload.

7. The relay device of claim 3 wherein the physical layer signalling comprises at least one from a group of: ACK/NACK, channel quality information (CQI), Precoding matrix indicator (PMI), rank indicator (RI).

8. The relay device of claim 1 wherein the control processor is further arranged to request an uplink resource from the base station in order to send the relay control element.

9. The relay device of claim 1 wherein the control processor is arranged to monitor a communication from the base station to the terminal device on a physical downlink control channel (PDCCH).

10. The relay device of claim 9 wherein the control processor is arranged to determine from the PDCCH at least one physical uplink control channel (PUCCH) resource from the terminal device.

11. The relay device of claim 1 wherein the control processor is further arranged to modify the uplink message on the at least one uplink resource by identifying the terminal device prior to relaying the uplink message to the base station.

12. The relay device of claim 11 wherein the control processor is arranged to identify the terminal device by incorporating a C-RNTI into a control element of the uplink message.

13. The relay device of claim 11 wherein the control processor is further arranged to package transmitted ACK/NACK information into a control element of the received uplink message.

14. The relay device of claim 13 wherein the relayed uplink message is not associated with periodic transmission from the terminal device.

15. The relay device of claim 11 wherein the control processor is further arranged to determine from the uplink message HARQ ACK/NACK information associated with a previous physical downlink shared channel (PDSCH) transmission.

16. The relay device of claim 11 wherein the control processor is further arranged to determine from the uplink message channel quality information (CQI) associated with a previous physical downlink shared channel (PDSCH) transmission.

17. The relay device of claim 11 wherein the control processor is further arranged to receive an uplink message on the at least one uplink resource after the control processor has monitored a physical downlink shared channel (PDSCH) being used for a communication from the base station to the terminal device.

18. The relay device of claim 1 wherein the control processor is further arranged to configure the at least one receiver to receive the at least one uplink resource; and receive an uplink message on the at least one uplink resource.

19. A wireless communications system comprising the relay device of claim 1 for supporting uplink communication between a terminal device and a base station.

20. An integrated circuit for a relay device for supporting uplink communication between a terminal device and a base station, the integrated circuit comprising a control processor arranged to:
    monitor a downlink communication from the base station to the terminal device;
    determine therefrom at least one uplink resource to be used by the terminal device;
    configure the at least one receiver to receive the at least one uplink resource;
    receive an uplink message on the at least one uplink resource;
    determine therefrom uplink control information used by the terminal device;
    modify the uplink message on the at least one uplink resource; and
    relay the uplink message to the base station.

21. A method for supporting wirelessly communication from a terminal device to a base station via a relay device, the method comprising, at the relay device:
    monitoring a downlink communication from the base station to the terminal device;

determining therefrom at least one uplink resource to be used by the terminal device;
configuring at least one receiver of the relay device to receive the at least one uplink resource;
receiving an uplink message on the at least one uplink resource;
determining therefrom uplink control information used by the terminal device;
modifying the uplink message on the at least one uplink resource; and
relaying the uplink message to the base station.

22. A non-transitory computer program product comprising executable program code for supporting wirelessly communication from a terminal device to a base station via a relay device, the executable program code operable for, when executed at the relay device, performing the method of claim 21.

* * * * *

UNITED STATES PATENT AND TRADEMARK OFFICE
CERTIFICATE OF CORRECTION

PATENT NO. : 8,929,277 B2
APPLICATION NO. : 13/768611
DATED : January 6, 2015
INVENTOR(S) : Timothy Speight and Paul Piggin It is certified that error appears in the above-identified patent and that said Letters Patent is hereby corrected as shown below:

Title page, item (56),

Page 1, Column 2, Other Publications: Line 3, Change "Terresterial" to -- Terrestrial --;

Page 2, Column 2, Other Publications: Line 1, Change "Terresterial" to -- Terrestrial --;

Page 2, Column 2, Other Publications: Line 2, Change "Newtwork" to -- Network --;

Page 2, Column 2, Other Publications: Line 7, Change "Terresterial" to -- Terrestrial --; and Page 2, Column 2, Other Publications: Line 12, Change "Terresterial" to -- Terrestrial --.

Signed and Sealed this
First Day of December, 2015

Michelle K. Lee
*Director of the United States Patent and Trademark Office*